United States Patent [19]

McCallister

[11] 4,315,893

[45] Feb. 16, 1982

[54] REFORMER EMPLOYING FINNED HEAT PIPES

[75] Inventor: Robert A. McCallister, Mountain Lakes, N.J.

[73] Assignee: Foster Wheeler Energy Corporation, Livingston, N.J.

[21] Appl. No.: 217,363

[22] Filed: Dec. 17, 1980

[51] Int. Cl.³ .......................... G05D 23/00; B01J 8/00
[52] U.S. Cl. .................................. 422/109; 48/196 A; 60/649; 422/187; 422/200; 422/211; 422/234
[58] Field of Search ............... 422/200, 201, 211, 222, 422/234, 109, 187; 48/94, 196 A, 105; 60/648, 649

[56] References Cited

U.S. PATENT DOCUMENTS

| Re. 26,990 | 11/1970 | Bongiorno | 48/196 A X |
|---|---|---|---|
| 2,209,040 | 7/1940 | Simpson et al. | 422/201 X |
| 2,220,849 | 11/1940 | Riblett | 422/191 |
| 2,522,468 | 9/1950 | Smith | 252/37 B |
| 2,667,410 | 1/1954 | Pierce | 422/211 X |
| 2,778,610 | 1/1957 | Bruegger | 422/201 X |
| 3,264,066 | 8/1966 | Quartulli et al. | 48/196 A X |
| 3,565,588 | 2/1971 | Reynolds et al. | 48/105 |

Primary Examiner—William A. Cuchlinski, Jr.
Attorney, Agent, or Firm—Marvin A. Naigur; John E. Wilson; John J. Herguth, Jr.

[57] ABSTRACT

An apparatus is provided for supplying heat required for a reforming reaction through the use of heat pipes adapted to transfer heat from a source to reforming reactants. Heat pipes extend between two chambers, with a catalyst material being disposed within one of the chambers, such that heat is extracted from a hot fluid and then introduced into the reforming chamber in which a hydrocarbon and steam react in the presence of the catalyst.

14 Claims, 3 Drawing Figures

REFORMER EMPLOYING FINNED HEAT PIPES

BACKGROUND OF THE INVENTION

This invention relates to a process and apparatus for production of a synthesis gas comprising carbon monoxide and hydrogen through catalytic steam reforming of a hydrocarbon feedstock.

It is generally known that hydrocarbon feedstocks including, for example, gaseous forms such as methane or propane and liquid forms such as petroleum distillate fractions, can be reformed with steam in the presence of a catalyst to produce a synthesis gas for use in the synthesis of ammonia, methanol, oxo-alcohols or as a feed to a Fischer-Tropsch type reactor. Steam reforming of hydrocarbon feedstocks is an endothermic process requiring the addition of heat in order for the reforming reaction to occur. Conventional steam reforming is generally accomplished through the use of a furnace in which are disposed tubes packed with catalyst material. A fuel is usually combusted within the furnace, such that radiant energy heats the tubes disposed within the furnace. While the fuel is being combusted within the furnace a stream of hydrocarbon feedstock mixed with steam is passed through the catalyst packed tubes. Heat liberated during combustion is absorbed by the tubes, and then transferred to the stream, after which the reforming reaction takes place.

The present invention contemplates a method and apparatus for supplying the heat required for the reforming reaction through the use of heat pipes adapted to transfer heat from a source, such as gas turbine exhaust gases, to the reforming reactants. According to the apparatus aspect of the invention, an apparatus is provided which comprises two chambers, heat pipes extending between the chambers and a catalyst material disposed within one of the chambers. The first chamber is adapted to receive hot fluid such as exhaust from a gas turbine, and the second chamber is adapted to receive a stream including fluid hydrocarbon and steam. The catalyst material is disposed within the chamber adapted to receive the fluid hydrocarbon and steam. In accordance with the method aspect of the invention, a stream including fluid hydrocarbon and steam is introduced into a reaction chamber in which a catalyst material is disposed. Heat pipes extend from the reaction chamber into a second chamber through which hot fluid such as exhaust gas taken from a gas turbine is passed. Heat is extracted from the hot fluid and is then transferred through the heat pipes into the second chamber so as to provide heat energy necessary for reforming the hydrocarbon and steam in the presence of the catalyst into a synthesis gas comprised of hydrogen and carbon monoxide.

BRIEF DESCRIPTION OF THE DRAWINGS

The above brief description, as well as further objects, features and advantages of the present invention will be more fully appreciated by referring to the following detailed description of a presently preferred but nonetheless illustrative embodiment in accordance with the present invention, when taken in connection with the accompanying drawings wherein.

DESCRIPTION OF THE PREFERRED EMBODIMENT

Figure 1:
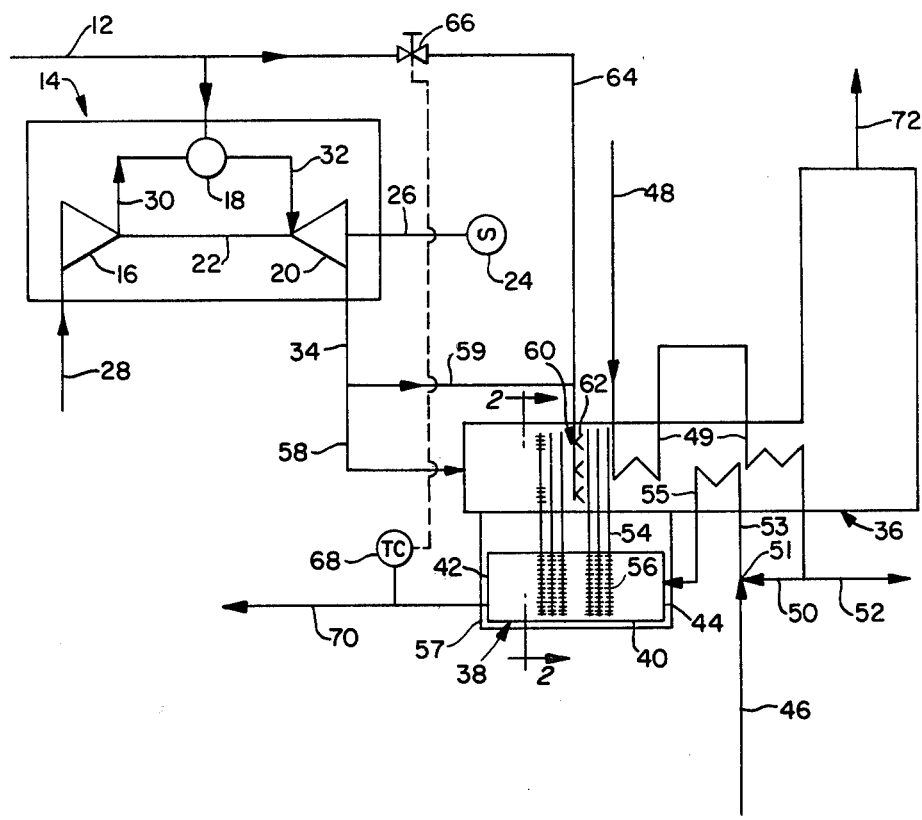
FIG. 1 is a schematic flow diagram illustrating the process and apparatus features of an embodiment of the present invention.

Referring to FIG. 1, there is shown a schematic flow diagram illustrating process and apparatus features of an embodiment of the present invention. In accordance with the invention a fuel, such as methane, is passed through line 12 to gas turbine 14. Gas turbine 14 includes a compressor 16, a combustor 18, and an expander 20, with compressor 16 and expander 20 sharing common shaft 22. Expander 20 of gas turbine 14 drives an electrogenerator 24 by being operatively connected thereto by shaft 26. It should be understood that gas turbine 14 could be used to drive compressor services rather than to generate electrical energy by operatively connecting shaft 26 to such a compressor. Such an application would be appropriate in cases where the final product is ammonia or methanol, since plants designed for production of these products normally have large compression requirements. The fuel flowing through line 12 is introduced to combustor 18, while an oxygen containing gas, such as air, is passed from line 28 into compressor 16 and then through line 30 into combustor 18. Within combustor 18 the fuel and air combust, and a heated exhaust gas is then passed through line 32 into expander 20. The exhaust gas is removed from expander 20 through line 34 and then introduced into waste heat boiler 36. Disposed adjacent waste heat boiler 36 is catalytic reformer 38. Reformer 38 is defined by a generally cylindrical chamber 40 with closure members 42 and 44 disposed at opposite ends of chamber 40. A fluid hydrocarbon such as, for example, methane, propane, or suitable petroleum distillate fraction, is passed through line 46. Water is passed through line 48 into heat exchanger 49 to form steam. All or a portion of this steam is delivered through line 50 and is added to the incoming hydrocarbon feed at point 51. Any unused portion of steam is removed through line 52. A stream of hydrocarbon feed mixed with steam flows through line 53, and is introduced into reformer 38 through an opening formed in clsoure member 44. It is to be understood that the mixed stream may also contain some carbon dioxide. The stream of hydrocarbon feed and steam can be preheated, as shown in FIG. 1, before introduction to reformer 38, such as by connecting line 53 to a heat exchanger 55 disposed within the enclosure of waste heat boiler 36.

A plurality of heat pipes 54 are adapted to extend between waste heat boiler 36 and reformer 38. It should be understood that where heat pipes 54 penetrate the walls of waste heat boiler 36 and reformer 38, seals are provided to prevent escape of fluids from waste heat boiler 36 and/or reformer 38. Within chamber 40, a plurality of fins 56 comprised of catalyst material, such as nickel are attached to heat pipes 54. Fins 56 could be made entirely from a material such as nickel, or could be metallic members coated (such as by being sprayed) with catalyst material. Because fins 56 include catalyst material they serve to promote the reaction of the hydrocarbon feed with the steam, and also to act as extended heat transfer surface within chamber 40. An enclosure 57 is disposed around sections of heat pipes 54 which extend between boiler 36 and reactor 38. In the preferred embodiment the enclosure also extends around reactor 38. The walls of enclosure 57 can be lined with insulation material, or insulation material 74 can be packed as shown in FIG. 2 within enclosure 57, in order to prevent loss of heat from heat pipes 54 and/or reactor 38.

Heated exhaust gases within a temperature range of approximately 900°-1500° F. are taken from gas turbine 14 and passed through line 34 and then through branch lines 58, 59 into the boiler 36. The heat possessed by these exhaust gases is transferred through heat pipes 54 and fins 56 to the reactant fluids pasing through chamber 40. If the heat transferred into chamber 40 is below a predetermined limit, such that the temperature of the product synthesis gas taken from reactor 38 is below a predetermined level, additional heat energy can be introduced into boiler 36 through the use of supplemental firing means 60. Firing means 60 include burners 62, fuel line 64 and branch line 59. The fuel passed through line 64 can be the same fuel which is used at gas turbine 14. This fuel can be bled from line 12 by opening valve 66. Valve 66 is operatively connected to a temperature controller 68 which is associated with line 70, through which the product synthesis gas is passed. Since the turbine exhaust gases are rich in oxygen, a portion of the turbine exhaust gases is used to supply the oxygen needed for combustion of the fuel at burners 62. The oxygen containing exhaust gas is passed through branch line 59 to burners 62.

After the hot gases pass over heat pipes 54, additional heat can be extracted from the exhaust gases by preheating feed fluids, such as the boiler feedwater passed through heat exchangers 49 and/or the reforming reactant stream passed through heat exchanger 53. The turbine exhaust gases are then exhausted through line 72 at a temperature of approximately 280° F.

Figure 2:
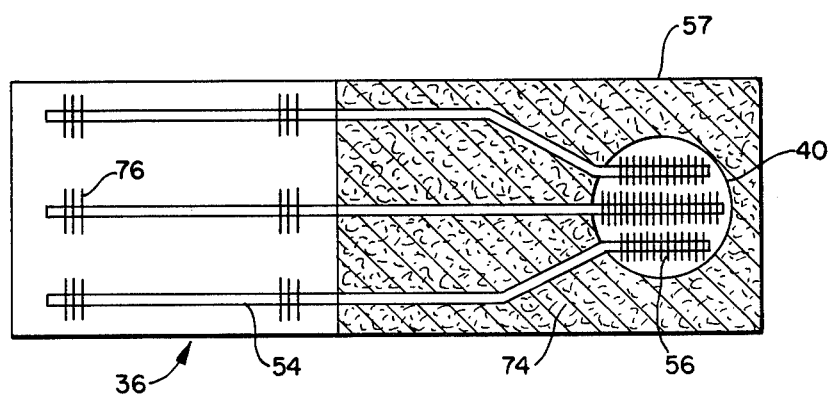
FIG. 2 is a schematic cross-section, taken along line 2—2 of FIG. 1, showing features of the apparatus aspect of the present invention.

Turning to FIG. 2, a sectional view taken along line 2—2 of FIG. 1 is shown. In this figure, heat pipes 54 are shown extending from within the enclosure of waste heat boiler 36 into chamber 40 of reformer 38. Enclosure 57 is also shown, and comprises a sheet metal box packed with insulation 74. Since gas turbines are sensitive to exhaust backpressure, the heat pipes are arranged within boiler 36 so as to create a low pressure drop across the enclosure of boiler 36. However, reformer 38 can accommodate relatively high pressure drop, and therefore fins 56 can be closely packed in order to enhance the reaction of the hydrocarbon fluid with the steam within chamber 40. Since the reforming reaction is taking place within a relatively thick walled vessel, rather than within relatively thin walled tubes as in conventional furnaces, the reaction can occur at temperatures and pressures higher than those associated with conventional reforming furnace operation. It is contemplated that chamber 40 could operate at internal pressures up to 2200 psig and in a temperature range of 900° F. to 1500° F.

In order to increase the efficiency of the heat pipe arrangement shown in FIG. 2, additional fins 76 can be attached to heat pipes 54 within boiler 36. These fins need not be made of catalyst material since they serve only as extended heat transfer surfaces.

With respect to the method aspect of the present invention, an example of a process employing the method would be as follows:

Methane gas is introduced through line 12 into combustor 18 of gas turbine 14. An oxygen-containing gas, such as air, is passed through line 28 into compressor 16 associated with gas turbine 14. Compressed oxygen-containing gas is passed through line 30 into combustor 18, and is combusted therein with the methane gas. Heated exhaust gases are removed from combustor 18 through line 32 and are expanded in exapnder 20. Expander 20 is operatively connected to compressor 16 through shaft 22, and is also operatively connected to electro-generator 24 through shaft 26. Exapnded heated exhaust gases are then passed through line 34 at a temperature of approximately 1000° F. All or a portion of the expanded exhaust gases flow through line 58 into boiler 36. When only a portion of the exhaust gases flow through line 58, the remainder of the expanded exhaust gases pass through line 59 to burners 62. In response to controller 68 valve 66 opens to pass a portion of the methane gas from line 12 through line 64 to burners 62 in order for supplemental firing to be initiated, if the temperature of the product synthesis gas is below a predetermined level. Oxygen contained in the exapnded exhaust gases flowing through line 59 combusts with the methane gas passed through line 64 at burners 62 in order to furnish supplemental heat energy to boiler 36. Exhaust gases flow through boiler 36, passing over portions of heat pipes 54. If desired, fins 76 can be attached to some or all of the heat pipes within boiler 36. After passing over heat pipes 54 the exhaust gases give up additional heat to feedwater flowing through heat exchangers 49 and to the stream of reactant fluid passed through heat exchanger 55. The exhaust gases are then removed from boiler 36 through line 72.

A hydrocarbon fluid such as methane is passed through line 46 and joins at point 51 with steam taken from line 48 through line 50 to form a reactant fluid stream. The reactant stream is passed through line 53 and is preheated within boiler 36 to a temperature of approximately 650° F. Thereafter the preheated reactant stream is introduced into chamber 40 through an opening formed in clsoure 44. Within chamber 40 the reactant gases pass over the heat pipes 54 and fins 56. Heat absorbed by heat pipes 54 from within boiler 36 is transferred through pipes 54 to the reactant fluids in chamber 40. Fins 56 are made of nickel and serve to promote reaction of the hydrocarbon with the steam contained in the reactant stream. The heat necessary for the reforming reaction is given off by the fins 56 and the heat pipes 54. To prevent loss of heat from heat pipes 54 and reactor 38, insulation 74 such as mineral wool is provided within enclosure 57 which is disposed around reactor 38 and portions of the heat pipes 54 disposed between reactor 38 and boiler 36. Within chamber 40 the hydrocarbon fluid reacts with the steam to form a product synthesis gas comprised of hydrogen and carbon monoxide gases. A stream of product synthesis gas is removed from reactor 38 through line 70. The temperature of the product gas is detected by temperature sensing and control means 68, and if the temperature is below a predetermined level, means 68 operates to open valve 66 to permit for operation of supplemental firing means 60 as previously explained.

Figure 3:
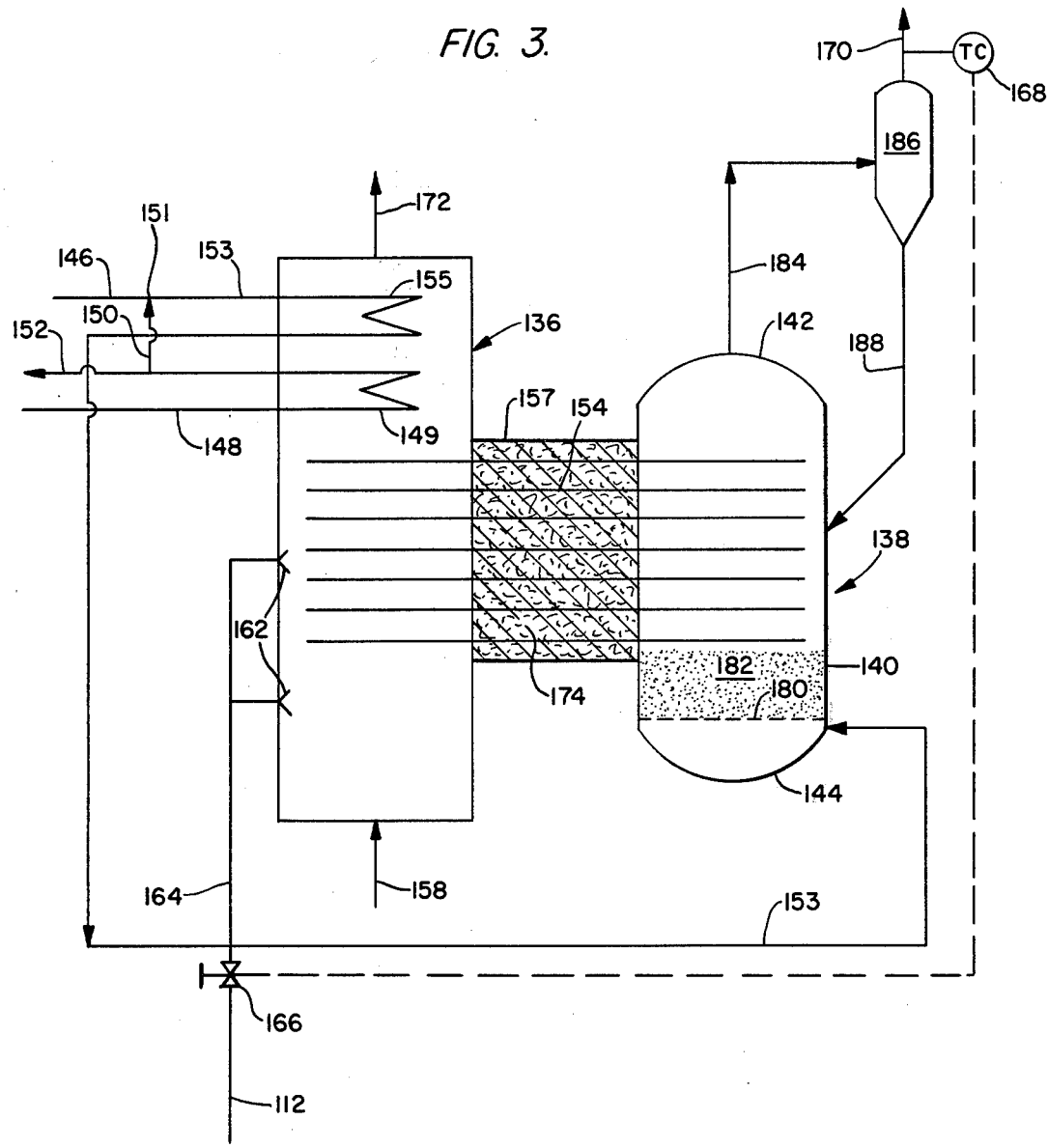
FIG. 3 is a schematic flow diagram illustrating another embodiment of the invention which includes a fluidized bed reactor.

In FIG. 3 there is illustrated another embodiment of the invention in which corresponding elements have been designated by the same reference numeral in a "100" series.

In this embodiment a heated gas, such as turbine exhaust gas, catalytic cracker regenerator off-gas, or the like can be introduced into boiler 136 through line 158. If direct firing of a fuel, such a methane gas, is desired, either in combination with the heated gas passed through line 158, or in lieu of that source of heat, fuel is passed through lines 112, 164 to burners 162. It is to be understood that a variety of direct firing arrangements will have application to this invention, including fluidized bed combustion, and that the particular embodiment shown is merely illustrative of a presently preferred embodiment.

Heat associated with either exhaust gas introduced through line 158 or with combustion products associated with burners 162 is absorbed by heat pipes 154 which extend into boiler 136. Heat is also absorbed downstream of heat pipes 154 by water passed through line 148 into heat exchanger 149, thereby converting the water into steam. A stream of hydrocarbon feed, such as methane gas, is passed through line 146 to a point 151 where it joins with steam taken from line 150 from line 148. The unused portion of steam flowing through line 148 is passed through line 152, the combined stream of hydrocarbon feed and steam is passed through line 153 to heat exchange 155 preheating. Exhaust gases are removed from boiler 136 through line 172.

The heat pipes 154 extend from within boiler 136 into reformer 138. Reformer 138 comprises a generally cylindrical vessel 140 having a top closure 142 and a bottom closure 144. An opening is formed in clsoure 144 through which line 153 can pass. Line 153 penetrates closure 144 below a perforated plate 180 which is adapted to distribute the incoming mixture of preheated hydrocarbon feed and steam within reformer 138. An inert material in the form of relatively fine spheres or grains 182 is disposed within reformer 138 above plate 180, and is fluidized by the incoming fluid passed through perforated plate 180. It is anticipated that through the use of this fluidized bed reactor, good mixing, as well as good heat transfer to the reactants will occur. It is to be understood that other distributing means, such as a grid or grate, can be used in lieu of plate 180 to distribute the mixture of preheated feed material within reformer 138.

Catalyst material can be disposed on the outside surfaces of heat pipes 154, or as shown in FIG. 1, can be formed into fins attached to heat pipes 154 within reformer 138. It is also contemplated that the bed material could be coated with catalyst material, or could even be comprised of catalyst.

An enclosure 157 is disposed around that portion of heat pipes 154 which extend between boiler 136 and reformer 138. Insulation 174 is disposed within enclosure 157 and together enclosure 157 and insulation 174 prevent heat losses from heat pipes 154.

Within reformer 138 the hydrocarbon and steam feed react in the presence of the catalyst material, which could be nickel, for example, as heat is transferred from heat pipes 154 into reformer 138. A product synthesis gas comprised of hydrogen and carbon monoxide is removed from reactor 138 through line 184, and is then passed into separator 186. Bed materials which may have become entrained in the product gas are separated out in separator 186, and recirculated through line 188 to reformer 138. Product synthesis gas is passed from separator 186 through line 170. A temperature sensing and control means 168, which measures the temperature of the product gas flow through line 170, is operatively connected to control valve 166 in order to control the amount of fuel sent to burners 162.

It is contemplated that the present invention will have application to many processes, including those for producing methanol, ammonia, and/or oxo-alcohols, as feed to a Fischer-Tropsch type reactor and/or as fuel cell gas. Heat souces include, but are not limited to, direct firing, gas turbine exhaust, catalytic cracker regenerator off-gas and the like.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

What I claim is:

1. An apparatus for producing synthesis gas including carbon monoxide and hydrogen, said apparatus comprising:
    (a) a first chamber adapted to receive a heated fluid,
    (b) a second chamber spaced apart from said first chamber and adapted to receive a stream including fluid hydrocarbon and steam, said stream being at a temperature lower than the temperature of said heated fluid,
    (c) a plurality of heat pipes disposed between said first and second chamber, a first portion of said heat pipes extending within said first chamber, a second portion of said heat pipes extending within said second chamber,
    (d) a catalyst material disposed within said second chamber, said steam reacting with said fluid hydrocarbon when in the presence of said catalyst to yeidl said synthesis gas,
    (e) means for introducing said heated fluid into said first chamber,
    (f) means for introducing said stream to said second chamber, and
    (g) means for removing said synthesis gas from said second chamber.

2. The apparatus of claim 1 wherein said first chamber adapted to receive a heated fluid comprises a chamber adapted to receive hot exhaust gases.

3. The apparatus of claim 2 wherein said exhaust gases are received from a gas turbine, said gas turbine being operatively connected to an electrogenerator to generate electrical energy.

4. The apparatus of claim 2 further comprising means for burning a fuel within said first chamber to introduce supplemental heat energy into said first chamber.

5. The apparatus of claim 4 further comprising temperature sensing means operatively connected to said means for removing said synthesis gas whereby said temperature of said synthesis gas can be measured, and means for regulating the amount of said fuel to be burned in said first chamber.

6. The apparatus of claim 4 wherein said means for introducing said heated fluid into said first chamber includes a first conduit adapted to pass a first portion of said heated fluid directly into said first chamber and a second conduit adapted to pass the remaining portion of said exhaust gas to said means for burning said fuel within said first chamber, said burning means comprising a burner adapted to introduce supplemental heat energy into said first chamber.

7. The apparatus of claim 6 further including an electrogenerator operatively connected to said gas turbine.

8. The apparatus of claim 1 wherein said first chamber adapted to receive a heated fluid comprises a boiler, said boiler including an enclosure and means for combusting a fuel within said enclosure.

9. The apparatus of claim 1 further comprising a plurality of fins disposed within said first chamber and attached to said first portion of said heat pipes.

10. The apparatus of claim 1 wherein said catalyst material disposed within said second chamber comprises a plurality of metallic fins including catalyst material disposed within said second chamber and attached to said second portion of said heat pipes.

11. The apparatus of claim 1 wherein said catalyst material disposed within said second chamber comprises catalyst material coated on said second portion of said heat pipes.

12. The apparatus of claim 1 further comprising distributing means disposed within said second chamber and below said second portion of said heat pipes, said means for introducing said stream to said second chamber being adapted to introduce said stream into said chamber below said distributing means, and wherein said catalyst material disposed within said second chamber includes solid particulate material disposed above said distributing means.

13. The apparatus of claim 12 wherein said means for removing said synthesis gas from said second chamber includes a conduit adapted to receive said synthesis gas from said second chamber, means for separating particulate material out of said synthesis gas, means for recirculating said separated particulate material to said second chamber, and means for removing synthesis gas from said separating means.

14. The apparatus of claim 1 wherein said heat pipes further include a portion intermediate said first and second chambers, and further comprising means for insulating said intermediate portion of said heat pipes and said second chamber.

* * * * *